United States Patent
Gudala et al.

(10) Patent No.: US 9,697,320 B2
(45) Date of Patent: Jul. 4, 2017

(54) RECTILINEAR MACROS HAVING NON-UNIFORM CHANNEL SPACING

(71) Applicant: QUALCOMM Incorporated, San Diego, CA (US)

(72) Inventors: Sreedhar Gudala, San Diego, CA (US); Kumar Gopal Rao, San Diego, CA (US); Francis Page, San Diego, CA (US); Pak Kin Wong, Union City, CA (US); Sunil Kumar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 63 days.

(21) Appl. No.: 14/864,156

(22) Filed: Sep. 24, 2015

(65) Prior Publication Data
US 2017/0091365 A1    Mar. 30, 2017

(51) Int. Cl.
*G06F 17/50* (2006.01)
*G06F 15/78* (2006.01)
(Continued)

(52) U.S. Cl.
CPC ...... *G06F 17/5072* (2013.01); *G06F 15/7807* (2013.01); *G06F 17/5068* (2013.01); *G06F 17/5077* (2013.01); *G06F 3/064* (2013.01); *G06F 3/0679* (2013.01); *G06F 11/1423* (2013.01); *G06F 12/0646* (2013.01); *G06F 17/5045* (2013.01); *G06F 2212/2542* (2013.01); *G06F 2213/0038* (2013.01); *G06F 2217/66* (2013.01)

(58) Field of Classification Search
CPC ............. G06F 17/5072; G06F 15/7867; G06F 2213/0038; G06F 11/1423; G06F 12/0646; G06F 17/5045; G06F 2212/2542; G06F 3/064; G06F 3/0679
See application file for complete search history.

(56) References Cited

U.S. PATENT DOCUMENTS

| | | | | |
|---|---|---|---|---|
| 4,910,680 A | * | 3/1990 | Hiwatashi | G06F 17/5077 257/E23.151 |
| 5,883,814 A | * | 3/1999 | Luk | G06F 17/5068 716/104 |

(Continued)

OTHER PUBLICATIONS

Tom et al.; "Logic block clustering of large designs for channel-width constrained FPGAs"; Year: 2005; Proceedings. 42nd Design Automation Conference, 2005; pp. 726-731.*

(Continued)

*Primary Examiner* — Helen Rossoshek
(74) *Attorney, Agent, or Firm* — Haynes and Boone, LLP

(57) ABSTRACT

Circuits and methods for a system on a chip having non-uniform channel spacings is provided. In an example, a chip is provided that includes a first functional block having a rectilinear shape, the first processing unit having on a side a plurality of channel spacings. A first channel spacing of the plurality of channel spacings is positioned in contact with the side and a second functional block. A second channel spacing of the plurality of channel spacings is positioned in contact with the side and the second functional block. The width of the second channel spacing is non-uniform with the width of the first channel spacing.

26 Claims, 6 Drawing Sheets

(51) Int. Cl.
    *G06F 11/14*    (2006.01)
    *G06F 3/06*     (2006.01)
    *G06F 12/06*    (2006.01)

(56)           References Cited

U.S. PATENT DOCUMENTS

| | | | | |
|---|---|---|---|---|
| 6,230,304 | B1* | 5/2001 | Groeneveld | G06F 17/505 |
| | | | | 716/113 |
| 6,567,967 | B2* | 5/2003 | Greidinger | G06F 17/5077 |
| | | | | 716/104 |
| 6,934,924 | B2* | 8/2005 | Paul | G06F 17/5068 |
| | | | | 716/114 |
| 6,961,913 | B1* | 11/2005 | Okazaki | G06F 17/5045 |
| | | | | 716/102 |
| 7,290,238 | B2* | 10/2007 | Stauffer | G06F 17/505 |
| | | | | 716/102 |
| 7,340,585 | B1* | 3/2008 | Ganesan | G06F 15/7867 |
| | | | | 712/15 |
| 7,836,422 | B1* | 11/2010 | Huang | G06F 17/5077 |
| | | | | 257/207 |
| 7,904,840 | B2 | 3/2011 | Tang | |
| 7,992,122 | B1* | 8/2011 | Burstein | G06F 17/5072 |
| | | | | 703/19 |
| 8,161,446 | B2* | 4/2012 | Qiu | G06F 17/5045 |
| | | | | 716/126 |
| 8,204,732 | B1* | 6/2012 | Simsek | G06F 8/34 |
| | | | | 703/16 |
| 8,307,116 | B2* | 11/2012 | Keckler | G06F 15/7825 |
| | | | | 370/389 |
| 8,484,594 | B2* | 7/2013 | Kucar | G06F 17/5072 |
| | | | | 716/110 |
| 8,566,776 | B2* | 10/2013 | Qiu | G06F 17/5077 |
| | | | | 703/13 |
| 8,661,388 | B2 | 2/2014 | Chen et al. | |
| 8,661,390 | B2 | 2/2014 | Cheng | |
| 8,683,100 | B1* | 3/2014 | Wang | H04L 5/0058 |
| | | | | 370/395.4 |
| 8,726,221 | B2* | 5/2014 | Teoh | G06F 17/5081 |
| | | | | 716/135 |
| 8,861,452 | B2* | 10/2014 | Barbieri | H04W 48/10 |
| | | | | 370/329 |
| 8,893,073 | B2 | 11/2014 | Rashingkar et al. | |
| 8,949,760 | B2 | 2/2015 | Birch et al. | |
| 9,165,103 | B1* | 10/2015 | Salowe | G06F 17/5077 |
| 9,201,999 | B1* | 12/2015 | Sahni | G06F 17/5072 |
| 9,542,118 | B1* | 1/2017 | Lercari | G06F 3/064 |
| 2006/0080630 | A1 | 4/2006 | Lin | |
| 2006/0200785 | A1* | 9/2006 | Borkovic | G06F 17/5031 |
| | | | | 716/113 |
| 2010/0082881 | A1* | 4/2010 | Klein | G06F 3/0607 |
| | | | | 711/103 |
| 2010/0262762 | A1* | 10/2010 | Borchers | G06F 3/0613 |
| | | | | 711/103 |
| 2011/0268137 | A1* | 11/2011 | Hill | H03K 19/17732 |
| | | | | 370/479 |
| 2012/0126850 | A1* | 5/2012 | Wasson | G06F 15/7867 |
| | | | | 326/38 |
| 2012/0126851 | A1* | 5/2012 | Kelem | G06F 15/7867 |
| | | | | 326/38 |
| 2013/0138868 | A1* | 5/2013 | Seroff | G06F 3/0611 |
| | | | | 711/103 |
| 2013/0138877 | A1* | 5/2013 | Ganapathy | G06F 13/28 |
| | | | | 711/105 |
| 2013/0297852 | A1* | 11/2013 | Fai | G11C 16/12 |
| | | | | 711/103 |
| 2014/0351780 | A1* | 11/2014 | Keckler | G06F 17/5054 |
| | | | | 716/117 |
| 2015/0100937 | A1 | 4/2015 | Ellavsky et al. | |
| 2015/0200667 | A1* | 7/2015 | Chandrasekaran | G06F 1/3287 |
| | | | | 713/324 |
| 2016/0180001 | A1* | 6/2016 | Adler | G06F 17/5045 |
| | | | | 716/138 |
| 2016/0209897 | A1* | 7/2016 | Henry | G06F 9/30076 |

OTHER PUBLICATIONS

C. H. Ng ; "A "Gridless" Variable-Width Channel Router for Macro Cell Design"; Year: 1987; 24th ACM/IEEE Design Automation Conference; pp. 633-636.*

D. B. Polk; "A Three-Layer Gridless Channel Router with Compaction"; Year: 1987; 24th ACM/IEEE Design Automation Conference; pp. 146-151.*

International Search Report and Written Opinion—PCT/US2016/051125—ISA/EPO—Dec. 23, 2016.

* cited by examiner

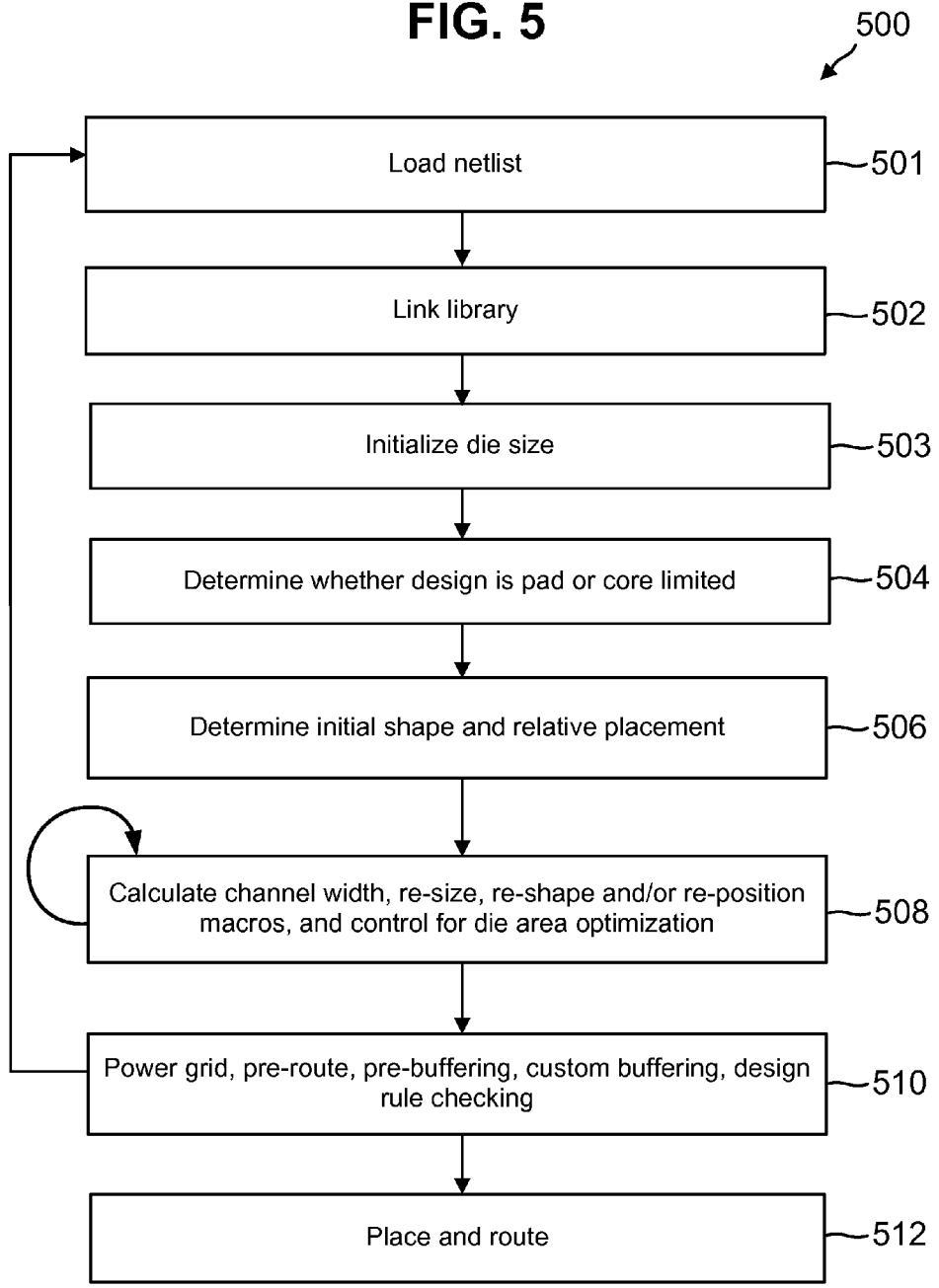

RECTILINEAR MACROS HAVING NON-UNIFORM CHANNEL SPACING

TECHNICAL FIELD

This application relates to integrated circuits, and more particularly, to system on a chip (SoC) design, wherein a chip has multiple channel spacings for a given functional unit in order to use area efficiently.

BACKGROUND

In conventional SoC designs, it is advantageous to incorporate floor planning to integrate designs in a way that is optimal for considerations such as power, performance and area. Floor planning refers to designing a floor plan for an integrated circuit, such as an application specific integrated circuit (ASIC). The floor plan provides a physical description of the layout of the integrated circuit. A conventional floor plan specifies, for example, physical placement of functional blocks (referred to as "macros") in the integrated circuit and communication channels between the blocks. An integrated circuit may also be referred to as a "chip" and is typically made of semiconductor material.

A macro may be any functional block, such as any processing unit. For example, macro may be a central processing unit (CPU), modem, graphics processing unit, camera module, memory, and so forth. A macro may also include one or more (sub) macros that are within the macro.

In addition to physical descriptions of the integrated circuit, logical descriptions of the integrated circuit are also used in floor planning. Logical descriptions of the integrated circuit are provided by a hierarchical netlist that describes the interconnection of the macros, the logic cells within the macros and the logic cell terminals/ports. The number of logical connections provided in the netlist defines the number of physical connections such as interconnects and wires that are used to accommodate the logical connections. Each connection between the macros may also be referred to as a "net."

The structure of the integrated circuit provides for nets that extend across a channel spacing that is positioned between the macros. The channel spacing between the macros has a defined width, that is a distance between the macros, and that may be referred to as a channel spacing width. A channel spacing width may be measured across any axis. For example, a channel spacing width may be measured along a horizontal axis, a vertical axis, a vertical axis and a horizontal axis, and so forth. The channel spacing width determines the number of nets that can be accommodated between the macros. In general, a greater channel spacing width may accommodate a larger number of nets.

Conventional integrated circuit design includes designing the channel spacing between macros to have a width that accommodates the largest number of nets used between the macros. For example, if there are a first set of nets and a second set of nets between a first macro and a second macro, the channel spacing is designed to have a width that accommodates the larger of the first set of nets and the second set of nets. Accordingly, while the channel spacing width is sufficient to accommodate the larger set, the channel spacing width is oversized with regard to the smaller set. The oversized space is wasted space that may negatively result in increasing the area of the integrated circuit. Thus, there is a need in the art for an improved system and method of floor planning.

SUMMARY

Circuits and methods for providing a SoC with an improved floor plan are disclosed herein. In one example, a floor planning technique is used to perform analysis of nets between two or more macros. For example, floor planning is used to determine the width of a channel spacing to insert between two macros, based upon the number of nets to be accommodated between the macros.

The macros may be re-sized, re-shaped and re-positioned to optimize the die area. For example, a macro may have a certain number of nets at a first channel spacing of a channel, but a lower number of nets at second channel spacing of the channel. Accordingly, at the second channel spacing, the floor planning technique may identify that the width of the second channel spacing may be reduced from the width of the first channel spacing.

The width of the second channel spacing may be reduced by extending the one or both macros into the second channel spacing. For example, a macro may be extended into the second channel spacing by adding a rectilinear portion that protrudes into the second channel spacing. Similarly, where the number of nets is increased, a rectilinear portion of the macro may be subtracted in order to increase the channel spacing and thereby accommodate the increased number of nets.

Various embodiments provide one or more advantages over conventional solutions. For instance, some embodiments improve upon conventional floor planning layouts by providing a first macro that includes a side with a plurality of facets that each contact a channel spacing and face a second macro. The plurality of facets may re-sized, re-shaped and/or re-positioned in order to extend or recede the facets and thus increase or decrease the width of the channel spacing. Thus, by re-sizing, re-shaping and/or re-positioning the facets, the macro is designed to more efficiently use the area of the channel spacing. These embodiments provide improved utilization of the area of the SoC layout, which in some examples results in reducing the area of the SoC.

BRIEF DESCRIPTION OF THE DRAWINGS

FIG. 5 is a flow diagram of an exemplary method for designing a floor plan layout of an SoC, according to one embodiment.

DETAILED DESCRIPTION

Example Integrated Circuits

FIG. 1A, FIG. 1B, FIG. 2 and FIG. 3 illustrate example SoC designs that include non-uniform channel spacing between macros, in order to have macros occupy channel spacing that otherwise would be wasted.

Figure 1A:
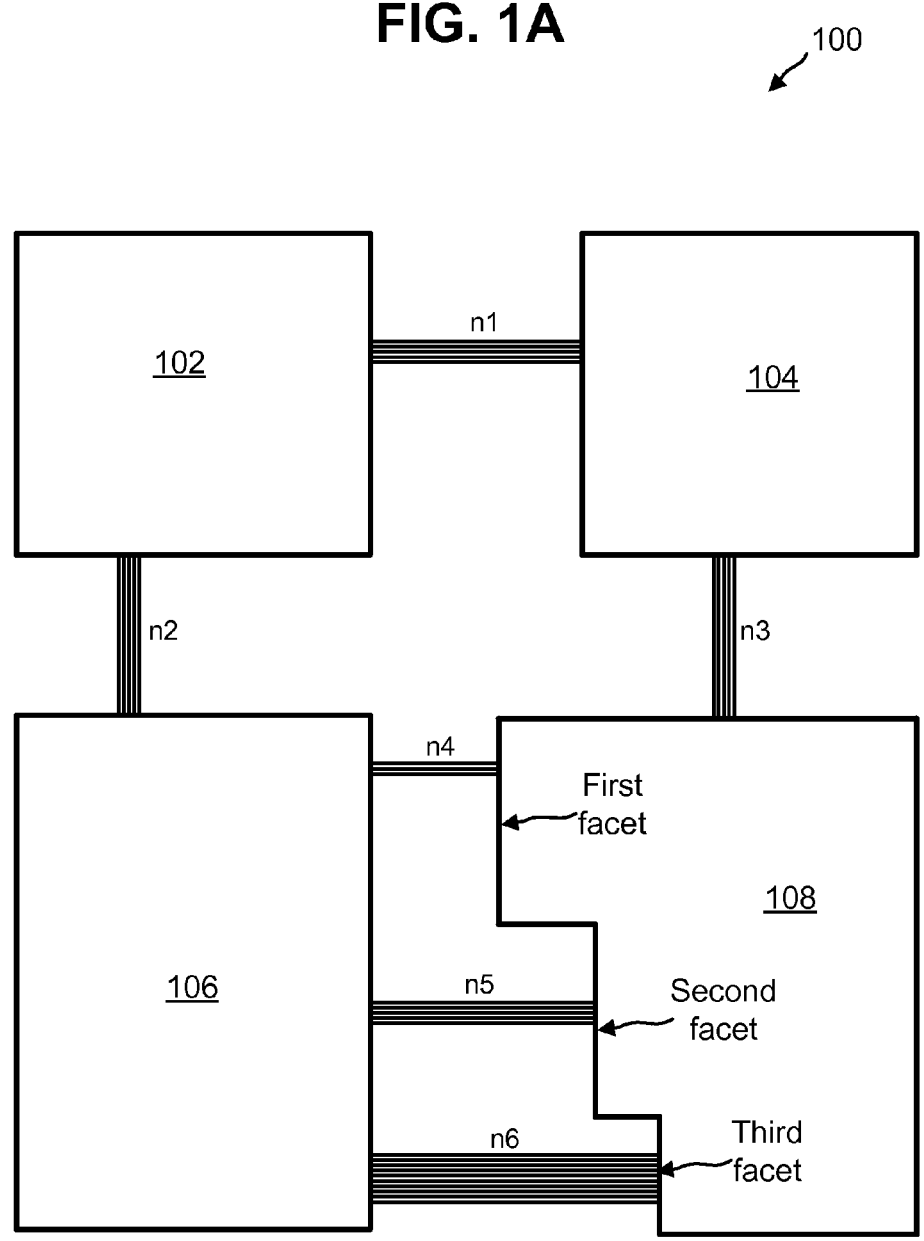
FIG. 1A is an organizational diagram of an exemplary SoC having multiple functional blocks according to aspects of the present disclosure.

FIG. 1A shows an example floor plan 100 of a chip that includes functional blocks 102, 104, 106 and 108. Other examples may include additional or fewer functional blocks. Functional blocks, which may be referred to as "macros," may also include sub-macros that are located within the functional blocks. In some examples, the functional blocks are processing units. In some examples, the functional blocks are components of a computer processor built on a semiconductor die.

A semiconductor die may be a block of semiconducting material upon which an integrated circuit is fabricated. The semiconductor die may include, for example, macros such as a central processing unit (CPU), graphics processing unit (GPU), a modem, and so forth. The macros may include sub-macro processing units within those structures, such as a digital signal processor core within a CPU, for instance. The semiconductor die may include connections, such as wires and interconnects, between the macros and the sub-macros.

In the present example, the functional blocks 102, 104, 106 and 108 are all rectilinear-shaped. In the present example, rectilinear include polygons having straight lines and right angles. In some examples, rectilinear may also describe shapes that are dominated by straight lines and right angles but may include smaller portions that are not defined by right angles, such as a small clipped edge, that does not detract from the overall rectilinear nature of the polygon.

Functional block 102 is communicatively coupled to functional block 104 via a set of nets n1 and functional block 106 via a set of nets n2. Functional block 102 is shaped as a square and is therefore rectilinear.

Functional block 104 is communicatively coupled to functional block 102 via the set of nets n1 and functional block 108 via a set of nets n3. Functional block 104 is shaped as a square and is therefore rectilinear.

Functional block 106 is communicatively coupled to functional block 102 via the set of nets n2 and functional block 108 via sets of nets n4, n5 and n6. Functional block 106 has a rectangular shape and is therefore rectilinear.

Functional block 108 is rectilinear, as it includes straight lines and right angles, which are provided by the rectangular portions of functional block 108. Functional block 108 is communicatively coupled to functional block 106, via the sets of nets n4, n5 and n6 and functional block 104 via the set of nets n3. Functional block 108 has a rectangular-shaped portion that extends into a channel spacing occupied by the set of nets n4, with a rectangular-shaped portion that is recessed from the channel spacing occupied by the set of nets n5, and a rectangular-shaped portion that is further recessed at the channel spacing occupied by the set of nets n6. The extending and receding of the rectangular portions of functional block 108 provides for non-uniform channel spacings between functional block 108 and functional block 106. For example, the channel spacings may be non-uniform to provide a narrower channel spacing that accommodates fewer nets and a wider channel spacing that accommodates a larger number of nets.

In the present example, each set of nets n1, n2, n3, n4, n5 and n6 represents a plurality of communication connections, such as interconnects and wires that communicatively couple the functional blocks. The interconnects and wires extend between the functional blocks in three-dimensional space, such that the communication connections extend both vertically and horizontally between the functional blocks. Specifically, the semiconductor die itself may include a plurality of layers, where some of those layers are dielectric layers and other of those layers are conductive layers such as metal layers. The metal layers may be connected together using structures such as vias. The wires and interconnects utilize the vias and different layers of conductive material within the semiconductor die so that a port within a given sub macro is in communication with another port on another sub macro. The routing is performed three dimensionally, using multiple layers of the semiconductor die for each of the interconnects and wires. Communication connections of each set of nets are also layered above and below other communication connections. This concept is described more fully with respect to FIG. 4.

The areas between functional blocks are referred to as channel spacings. As shown in FIG. 1A, there is a channel spacing between functional blocks 102 and 104, across which the set of nets n1 extends. In the present example, the channel spacing is sized to accommodate the set of nets n1. A wider channel spacing may accommodate a larger set of nets than a narrower channel spacing because of the three-dimensional space occupied by each set of nets.

The set of nets n1 is shown as extending from a "side" or "face" of functional block 102 to a side or face of functional block 104. The sides of functional block 102 and functional block 104 that are coupled by the set of nets n1 are also shown as extending perpendicular to the width of the channel spacing that separates functional block 102 and functional block 104. The sides of functional block 102 and functional block 104 that are coupled by the set of nets n1 are facing each other. Two sides face one another if the two sides are parallel and are directly across the channel from one another. A first side and a second side are directly across the channel from one another if a line that is perpendicular to the first side and the second side can be drawn from a point on the first side to a point on the second side.

The channel spacing between functional blocks 102 and 104 is a uniform width channel spacing because the width of the channel spacing is substantially similar between functional blocks 102 and 104 at any point along the sides of functional blocks 102 and 104 that are facing each other. In some examples, channel spacing width is measured at the micron level, such that a substantially similar width would refer to having substantially the same micron width. As shown, the channel spacing between functional blocks 102 and 106 is also of uniform width. There is also a channel spacing of uniform width between functional blocks 104 and 108.

Turning now to functional blocks 106 and 108, there are three channel spacings between the functional blocks 106 and 108. The channel spacings have different widths, and are therefore of non-uniform width. As shown, the channel spacing between functional blocks 106 and 108 is narrower at the set of nets n4 than the channel spacing at the set of nets n5. The channel spacing at the set of nets n5 is narrower than the channel spacing at the set of nets n6. A channel spacing may be referred to as narrower or wider based on the distance across the channel spacing (as extending in a straight line perpendicular to the sides of the macros).

Functional block 106 has a side that faces functional block 108. Functional block 108 similarly has a side that faces functional block 106. The non-uniform channel spacings are provided by the functional block 108 having a side with three facets that are facing functional block 106, with each facet being a straight line portion of the side. The first facet of the side is the facet at which the set of nets n4 is coupled. The second facet of the side is the facet at which the set of nets n5 is coupled. The third facet of the side is the facet at which the set of nets n6 is coupled. The side of the functional block 108 that is facing functional block 106 includes the first facet, the second facet, the third facet, as well as the perpendicular straight line portions extending between the first facet and the second facet, and between the second facet and the third facet.

The first facet of the side of functional block 108 is perpendicular to the width of the channel spacing occupied by the set of nets n4. The first facet of the side of functional block 108 is parallel to the side of functional block 106 that is coupled to the sets of nets n4, n5 and n6.

The second facet of the side of functional block 108 is perpendicular to the width of the channel spacing occupied by the set of nets n5. The second facet of the side of functional block 108 is parallel to the side of functional block 106 that is coupled to the sets of nets n4, n5 and n6.

The third facet of the side of functional block 108 is perpendicular to the width of the channel spacing occupied by the set of nets n6. The third facet of the side of functional block 108 is parallel to the side of functional block 106 that is coupled to the sets of nets n4, n5 and n6.

The first facet, second facet and third facet of the side of functional block 108 are also parallel to each other.

The sets of nets n4, n5 and n6 extend across the width of each of the channel spacings between functional block 106 and functional block 108. The sets of nets n4, n5 and n6 are shown as extending across the channel spacings in a direction that is perpendicular to the facets, but may also include portions extending in other directions as well.

In the present example, the width of the channel spacing used by the set of nets n4 is narrower than the width of the channel spacing used by the set of nets n5. Similarly, the width of the channel spacing used by the set of nets n5 is narrower than the width of the channel spacing used by the set of nets n6. Each channel spacing may be sized based on the number of nets to be accommodated. For example, the set of nets n4 may have a narrower channel spacing due to having a fewer amount of nets and the set of nets n6 may have a wider channel spacing due to having a larger amount of nets.

The functional block 108 is designed to extend into the channel spacings to increase the area available for functional block 108 without increasing the area of the floor plan of the chip (such as by extending the outer boundaries of the chip). Similarly, a determination may be made to increase a channel spacing to accommodate more nets by receding a macro (e.g., by subtracting a rectilinear portion from the macro) as is shown with respect to the sets of nets n5 and n6 that are coupled to facets that are recessed from the first facet.

Figure 1B:
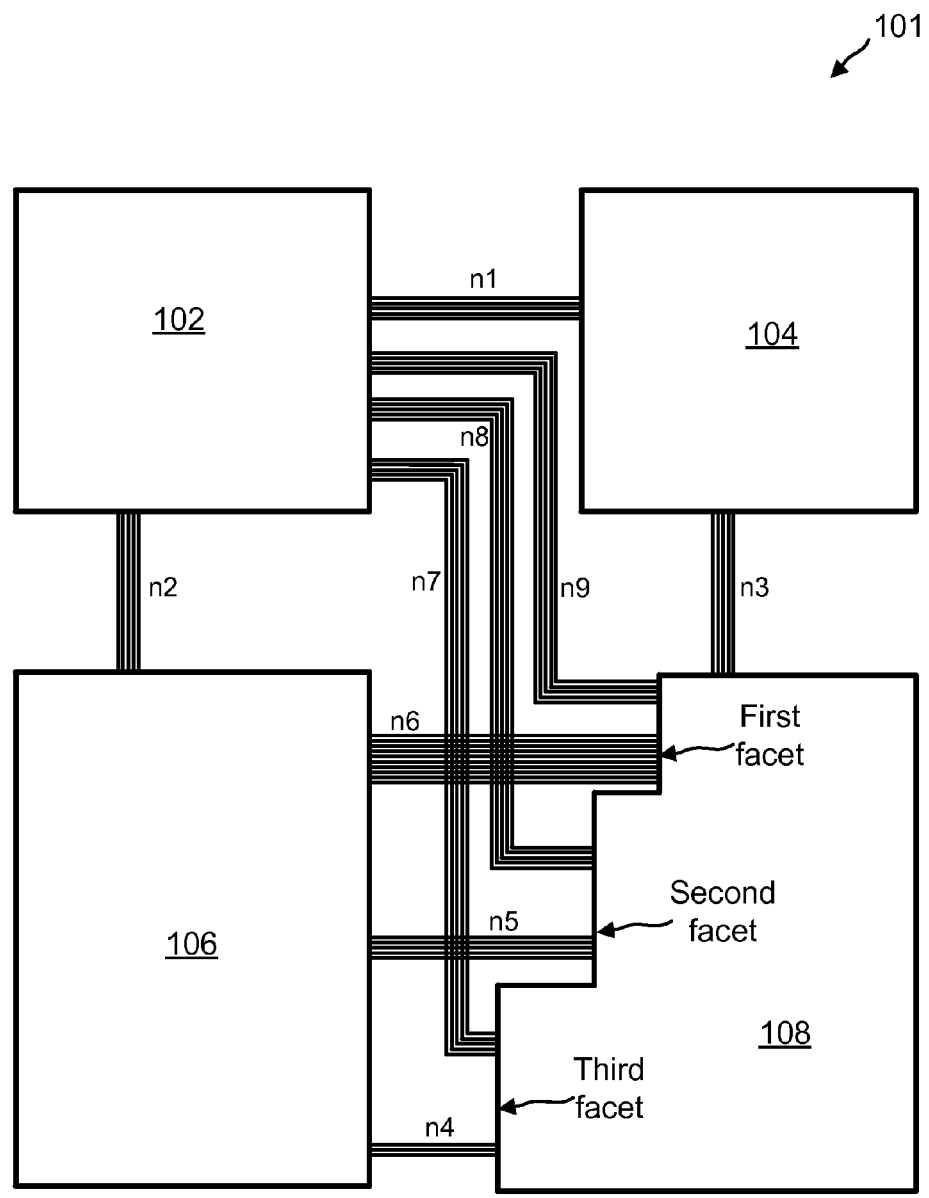
FIG. 1B is an organizational diagram of an exemplary SoC having multiple functional blocks according to aspects of the present disclosure.

FIG. 1B shows the example floor plan 100 of a chip that includes the functional blocks 102, 104, 106 and 108 that are also illustrated in FIG. 1A.

As shown in FIG. 1B, the functional block 108 is reshaped from its shape shown in in FIG. 1A, in order to accommodate the sets of nets n7, n8 and n9. Each set of nets n7, n8 and n9 represents a plurality of communication connections, such as interconnects and wires that communicatively couple the functional blocks. The interconnects and wires extend between the functional blocks in three-dimensional space, such that the communication connections extend both vertically and horizontally between the functional blocks 102 and 108.

Specifically, the semiconductor die itself may include a plurality of layers, where some of those layers are dielectric layers and other of those layers are conductive layers such as metal layers. The routing is performed three dimensionally, using multiple layers of the semiconductor die for each of the interconnects and wires. Communication connections of each set of nets are also layered above and below other communication connections. This concept is described more fully with respect to FIG. 4.

The set of nets n7 may be layered below and/or above the sets of nets n5 and n6 in order to separate the communication connections of the set of nets n7 from the communication connections of the sets of nets n5 and n6. Similarly, the set of nets n8 may be layered below and/or above the set of nets n6 order to separate the communication connections of the set of nets n8 from the communication connections of the set of nets n6.

There are channel spacings between functional blocks 102 and 108, across which the sets of nets n7, n8 and n9 extend. The sets of nets n7, n8 and n9 extend from a side of functional block 102 to facets of a side of functional block 108. The sides of functional block 102 and functional block 108 that are coupled by the sets of nets n7, n8 and n9 are parallel to each other.

There are three channel spacings between the functional blocks 102 and 108. The channel spacings have different widths, and are therefore of non-uniform width. As shown, the channel spacing between functional blocks 102 and 108 is narrower at the set of nets n9 than the channel spacing at the set of nets n7. The channel spacing at the set of nets n8 is narrower than the channel spacing at the set of nets n7 and wider than the channel spacing at the set of nets n9.

The non-uniform channel spacings are provided by the functional block 108 having a side with three facets, with each facet being a straight line portion of the side. The first facet of the side is the facet at which the sets of nets n6 and n9 are coupled. The second facet of the side is the facet at which the sets of nets n5 and n8 are coupled. The third facet of the side is the facet at which the sets of nets n4 and n7 are coupled.

The sets of nets n7, n8 and n9 extend across the width of each of the channel spacings between functional block 102 and functional block 108. The sets of nets n7, n8 and n9 are shown as extending across the channel spacings in a direction that is perpendicular to the sides of functional blocks 102 and 108 at some portions, and parallel to the sides of functional blocks 102 and 108 at other portions. The sets of nets may also include portions extending in other directions as well.

In the present example, the width of the channel spacing between functional block 102 and the first facet of functional block 108 is determined by the sets of nets n6, n7, n8 and n9. The width of the channel spacing between functional block 102 and the second facet of functional block 108 is determined by the sets of nets n5, n7 and n8. The width of the channel spacing between functional block 102 and the third facet of functional block 108 is determined by the sets of nets n4 and n7.

Figure 2:
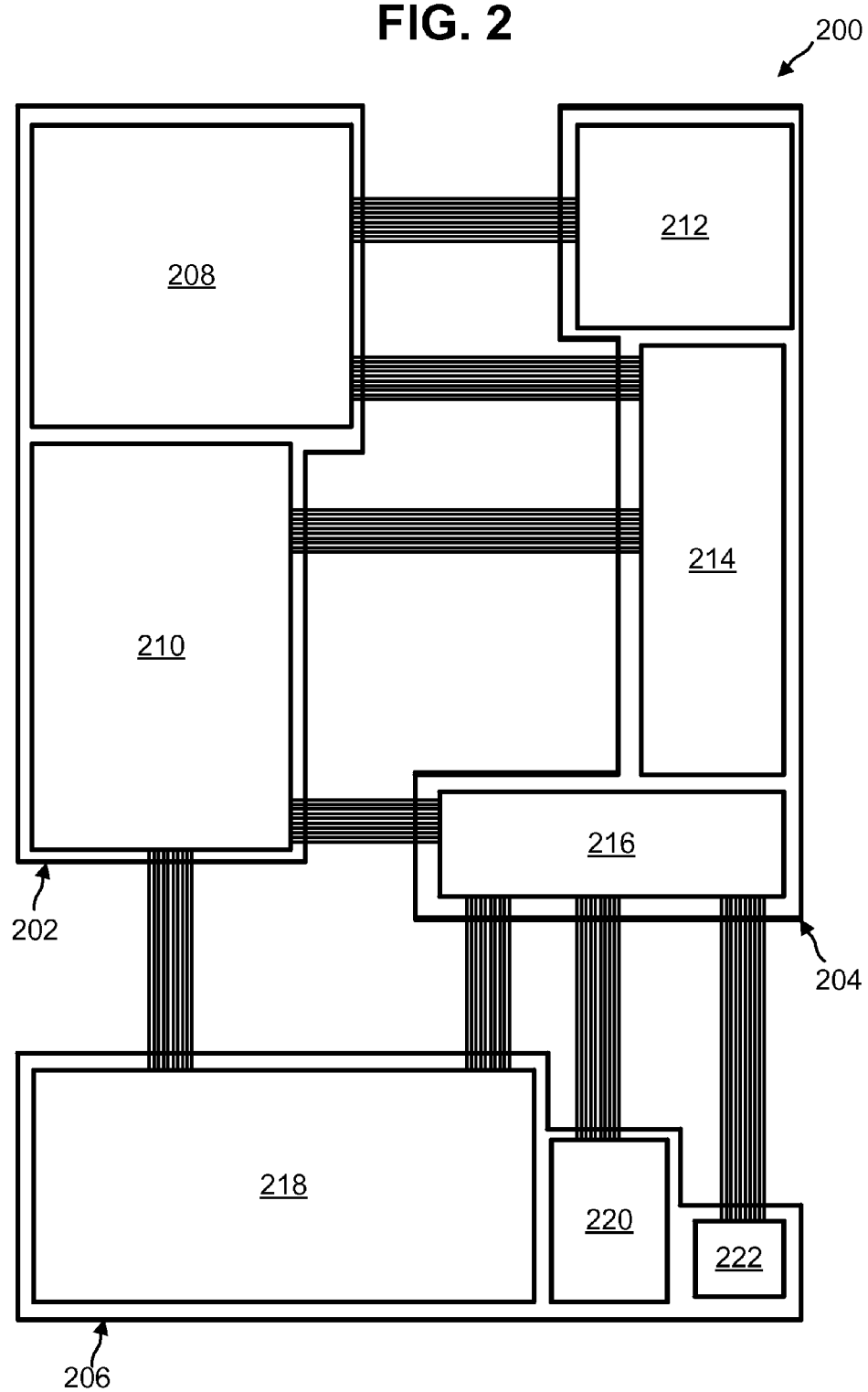
FIG. 2 is an organizational diagram of an exemplary SoC having multiple functional blocks according to aspects of the present disclosure.

FIG. 2 shows an example floor plan 200 that includes macros 202, 204 and 206 that are each rectilinear-shaped. Sub-macros may also be referred to as sub-blocks. Sub-macros may include additional macros within the sub-macros. In some examples, the macros and sub-macros are processing units. For example, a macro (e.g., macro 202, 204, 206) may be a central processing unit having sub-macros such as a first CPU core, a second CPU core, and a cache. In another example, a macro may be a display processor having sub-macros such as a display controller, video decoder, and HDMI interface. In yet another example, a macro may be a memory controller or a DDR interface.

Sub-macros may be coupled within a macro using connections such as wires and interconnects.

Macros (e.g., macros 202, 204 and 206) may be re-sized and re-shaped to accommodate each of the sub-macros. For example, a macro may be fitted to encompass the shapes and sizes of the sub-macros using a design tool. During design, a person with aid from the design tool may place the macro and sub-macros, and iteratively adjust placement, shape and size of the macros and sub-macros in an attempt to optimize chip area.

Macro 204 includes sub-macros 212, 214 and 216. Macro 206 includes sub-macros 218, 220 and 222.

In the present example, macro 202 is coupled to macro 204 via nets between (1) sub-macros 208 and 212, (2) sub-macros 208 and 214, (3) sub-macros 210 and 214, and (4) sub-macros 210 and 216. Macro 202 is coupled to macro 206 via nets between sub-macros 210 and 218. Macro 204 is coupled to macro 206 via nets between (1) sub-macros 218 and 216, (2) sub-macros 220 and 216, and (3) sub-macros 222 and 216.

Macro 202 is separated from macro 204 by four non-uniform channel spacings. For example, a first channel spacing between macros 202 and 204 separates sub-macro 208 from sub-macro 212. A second channel spacing between macros 202 and 204 separates sub-macro 208 from sub-macro 214. A third channel spacing between macros 202 and 204 separates sub-macro 210 from sub-macro 214. A fourth channel spacing between macros 202 and 204 separates sub-macro 210 from sub-macro 216. The channel spacings have different widths, and are thus non-uniform.

The side of macro 202 that faces macro 204 is in contact with the channel spacings. The side of macro 202 that faces macro 204 extends perpendicular to the width of the channel spacings. Similarly, the side of macro 204 that faces macro 202 extends perpendicular to the width of the channel spacings and also is in contact with the channel spacings.

Turning now to macro 206, macro 206 includes a side that is facing a side of macro 202. The sides extend parallel to one another and are separated by a channel spacing. The channel spacing between macros 202 and 206 has a uniform width along the entirety of the sides of macro 202 and 206 that are in contact with the channel spacing.

There are at least three channel spacings of non-uniform width between macro 206 and macro 204. As shown, the width of the channel spacing is wider between sub-macros 222 and 216 than the width of the channel spacing between sub-macro 220 and 216. The width of the channel spacing between sub-macro 218 and 216 is narrower than the widths of the channel spacings between sub-macros 220 and 216 and sub-macros 220 and 216.

While FIG. 2 illustrates a particular number of macros, sub-macros, nets and channel spacings, various other configurations may be utilized that include any number of macros, sub-macros, nets and channel spacings. Further, the macros and sub-macros may have various shapes. For example, the sub-macros are illustrated as having rectangular-shapes but in other examples may have rectilinear shapes that are not rectangular.

Figure 3:
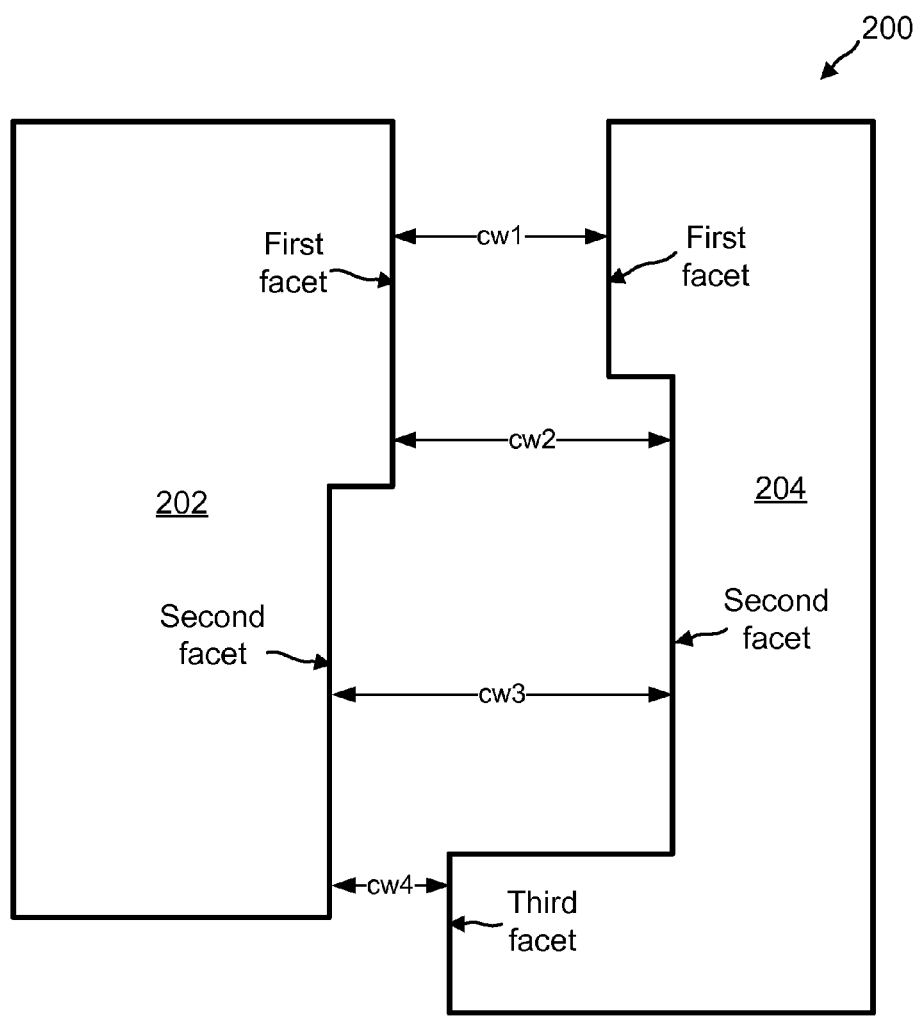
FIG. 3 is an organizational diagram of an exemplary SoC having multiple functional blocks according to aspects of the present disclosure.

FIG. 3 shows the example floor plan 200 that includes macros 202 and 204, which both have rectilinear shapes, as in FIG. 2 but omits macro 206 for ease of illustration.

Macro 202 includes a side that is facing a side of macro 204. The side of macro 202 includes two facets, a first facet and a second facet, that are facing the side of macro 204. The side of macro 204 includes three facets, a first facet, a second facet and a third facet that face the side of macro 202.

Macros 202 and 204 are separated by at least four different (i.e. non-uniform) channel spacings. The first channel spacing has a width cw1 between the first facet of macro 202 and the first facet of macro 204. The second channel spacing has a width cw2 between the first facet of macro 202 and the second facet of macro 204. The third channel spacing has a width cw3 between the second facet of macro 202 and the second facet of macro 204. The fourth channel spacing has a width cw4 between the second facet of macro 202 and the third facet of macro 204.

The first facet and second facet of macro 202 are parallel with each other. The first facet and second facet of macro 202 are also parallel with the first facet, second facet, and third facet of macro 204. The channel widths cw1, cw2, cw3, and cw4 extend in a perpendicular direction to the first facet and the second facet of macro 202 as well as the first facet, second facet, and third facet of macro 204.

The first facet of macro 202 faces the first facet of macro 204. The first facet of macro 202 also faces the second facet of macro 204. The first facet of macro 202 does not, however, face the third facet of macro 204. The third facet of macro 204 faces the second facet of macro 202, but does not face the first facet of macro 202, the first facet of macro 204 or the second facet of macro 204.

The channel widths cw1, cw2, cw3, and cw4 are each different from each other. For example, the channel spacing cw1 is narrower than the channel spacings cw2 and cw3, but wider than the channel spacing cw4. Accordingly, the channel spacing at cw1 is non-uniform with the channel spacings at cw2, cw3 and cw4. The channel spacing cw2 is wider than the channel spacings at cw1 and cw4, but narrower than the channel spacing cw3. Accordingly, the channel spacing at cw2 is non-uniform with the channel spacings at cw1, cw3 and cw4. The channel spacing at cw3 is wider than the channel spacings at cw1, cw2 and cw4. Accordingly, the channel spacing at cw3 is non-uniform with the channel spacings at cw1, cw2 and cw4.

The channel spacing at cw4 is narrower than the channel spacings at cw3, cw2 and cw1. Accordingly, the channel spacing at cw4 is non-uniform with the channel spacings at cw3, cw2 and cw1.

The first macro 202 and the second macro 204 utilize area of the channel spacings by extending into and receding from the channel spacings, thus causing the channel spacings to have non-uniform width. The use of the area of the channel spacing may allow for reductions in other areas of the macros, for example, by reducing the area used by the macros on sides that are not in contact with the channel spacings. Accordingly, using the area of the channel spacings may provide a more compact floor plan that uses a smaller area.

Figure 4:
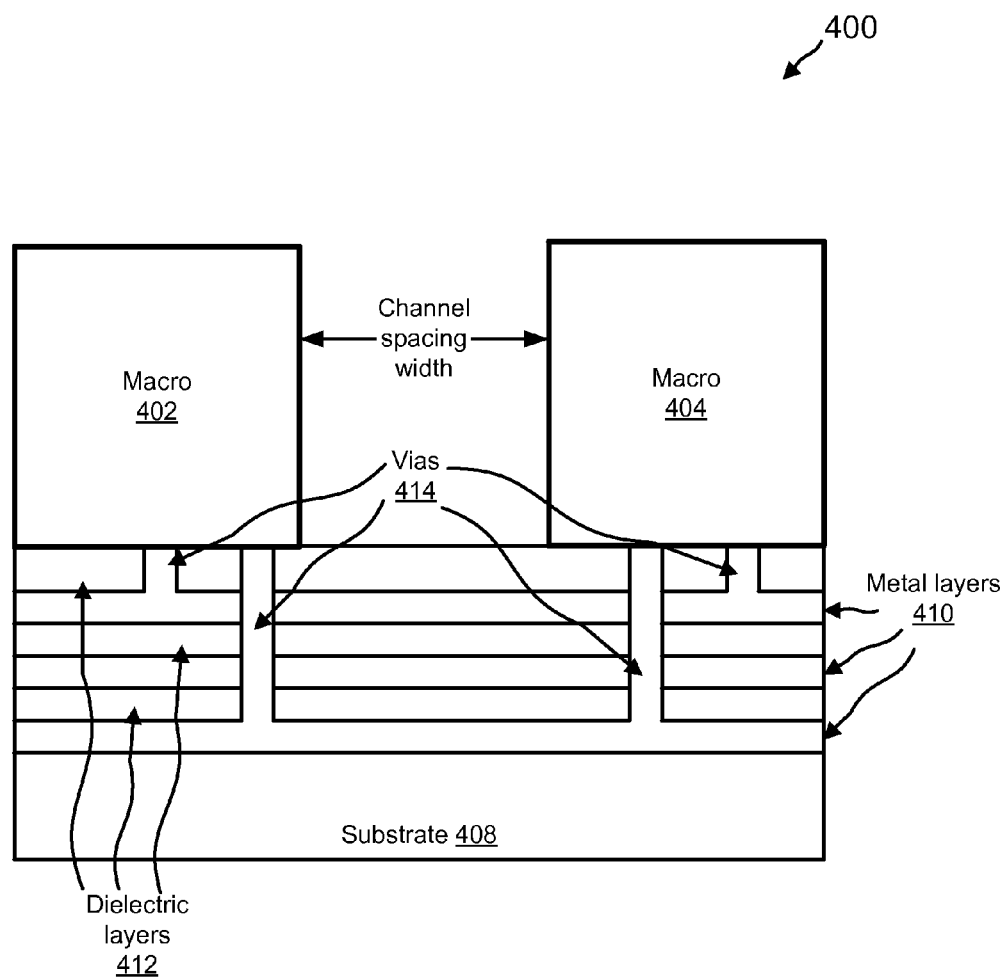
FIG. 4 is an cross-sectional diagram of an exemplary channel spacing between functional blocks according to aspects of the present disclosure.

FIG. 4 is a cross-sectional diagram of an exemplary channel spacing between functional blocks according to aspects of the present disclosure. FIG. 4 is for illustration only, and it is not drawn to scale.

In the present example, a semiconductor die 400 includes macros 402 and 404 that are positioned on a plurality of layers (e.g., metal layers 410 and dielectric layers 412) formed on a substrate 408. The plurality of layers also include conductive layers (e.g., metal layers 410) as well as insulating layers (e.g., dielectric layers 412). In the present example, the metal layers 410 and dielectric layers 412 are formed on a substrate 408. FIG. 4 is an example illustration of how macros may be physically placed in an integrated circuit in accordance with the principles described herein. While FIG. 4 shows only two macros 402, 404 and only a single channel spacing width, it is understood that when viewed from another dimension the example may include additional macros and further additional and non-uniform channel spacing widths in accordance with the examples of FIGS. 1, 2 and 3.

The metal layers 410 may be connected together using structures such as vias 414. The macros 402 and 404 may also be connected to the metal layers 410 using vias 414. The connecting of the metal layers 410 and macros 402 and 404 forms a plurality of communication channels, across which the macros 402 and 404 (and their corresponding sub-macros) are configured to communicate across channel spacings via communication signals transmitted using the plurality of communication channels.

There may be a plurality of interconnects and wires (not shown) provided by the metal layers 410 between the macros 402 and 404 such that the macros 402 and 404 are communicatively coupled. For example, the metal layers 410 and vias 414 may form communication channels (e.g., wires and/or interconnects) between various interfaces (e.g., hardware inputs and outputs) of the macros 402 and 404 that allow signals to be communicated between macros and sub-macros of the macros. The routing of communications between the macros 402 and 404 may be performed three dimensionally, using multiple layers of the semiconductor die for each of the connections.

In the present example, the distance between the macros 402 and 404 may be referred to as the channel spacing between the macros 402 and 404. The channel spacing has a channel spacing width, which is the distance between the macros 402 and 404.

As illustrated, the macros 402 and 404 may have various connections and interconnects between the channel spacing that are provided by the metal layers 410 and vias 414. In other examples, various other channel spacing configurations may be provided. For example, a channel spacing may have any number of wires and interconnects that are provided by any number of layers.

Example Methods

An aspect of the disclosure is the design and creation of appropriate floor plans. Accordingly, the present disclosure provides a method for designing a floor plan of an SoC that includes non-uniform channel spacings.

FIG. 5 is a flowchart of method 500 for designing a floor plan of an SoC, as is illustrated according to aspects of the present disclosure. In an embodiment, the method 500 may be implemented by one or more computers, by executing computer-readable instructions stored in a non-transitory computer-readable medium to perform the functions described herein. It is understood that additional steps can be provided before, during, and after the steps of method 500, and that some of the steps described can be replaced or eliminated for other embodiments of the method 500. Method 500 may be performed, for example, by one or more automated and/or user-operated software tools. An example of a method performed is shown in FIG. 5, which is described in more detail below.

At action 501, a netlist is loaded. In the present example, the netlist includes one or more sets of nets, each set of nets having one or more connections. The netlist may include all of the nets for the SoC or a subset of the nets. In some examples, the netlist is configured at least in part by a user and loaded from a memory such that it may be accessed.

At action 502, one or more libraries corresponding to functional components of the SoC design (such as macros) are linked in order to access information corresponding to the components.

At action 503, the die size is initialized. In some examples, initializing the die size refers to setting the die size based upon a user-configured die size, a preset die size, or a dynamically determined die size. In the present example, the die size refers to the area of a chip that may be used for the design of the floor plan.

At action 504, a determination is made whether the SoC design is pad limited or core limited. In some examples, the design is determined to be core limited when the active area of the chip is the limiting factor. In some examples, the design is determined to be pad limited when the number of pads in the chip is the limiting factor.

At action 506, based on the die size and constraints (e.g., pad limited vs. core limited), the initial shapes of the macros are determined as well as their relative placement on the die. This step may be performed, at least in part, by a user manually selecting macros and identifying their sizes, shapes and placement positions on the die.

At action 508, a channel width is calculated for at least one channel between two macros. For example, the nets for a particular channel may be input into the calculation, which outputs the channel width that would accommodate the nets.

In more detail, in the present example a channel between macros is divided into tracks. Nets are assigned to the tracks, such that the nets occupy one or more of the tracks in the channel. A calculation of the channel width that would accommodate the nets may have three primary components, as discussed below.

First, a power grid net may assigned to a top metal layer of the channel. The calculation may identify the entirety of the top layer as reserved for the power grid net, for example by inputting zero percent availability for the non-power grid nets in the top layer. For layers beneath the top metal layer, the power grid net may occupy a portion of the channel that is determined by subtracting the channel width by the width of the power grid net.

Second, critical nets, such as clock nets and high speed nets may be assigned to multiple tracks to provide higher speed and signal quality. These nets may have higher sensitivity and less tolerance to distortion caused by neighboring nets.

Finally, each remaining net is assigned to a track.

In some examples, the algorithm sums the number of tracks assigned to the power grid net, critical nets and remaining nets. The sum of the number of tracks identifies the total tracks utilized by the nets. The algorithm may then traverse from a start of a channel to an end of a channel, calculating a channel width at each segment based on the amount of tracks utilized at each segment. Accordingly, increasing an amount of nets in a segment may cause the channel width to increase at that segment, while decreasing an amount of nets in a segment may cause the channel width to decrease at that segment.

The calculation may be performed with respect to each set of nets and each channel. Based on the calculated channel widths, the macros are re-sized, re-shaped and re-positioned to provide channel spacings that accommodate each of the sets of nets. For example, a channel spacing may be wider to accommodate a larger set of nets and a narrower to accommodate a smaller set of nets.

For example, with respect to FIG. 1A, the calculation may determine that a first channel spacing would accommodate the set of nets n5, and that this channel spacing is wider than a second channel spacing that would accommodate the set of nets n4. Accordingly, the macro 108 may be re-positioned closer to macro 106 at the first channel spacing. This results in reducing the area of the floor plan by moving the macros closer together. However, since the second channel spacing is be wider, to accommodate the net of nets n5, the macro 108 is recessed at the second channel. Thus, the first and the second channels accommodate both sets of nets n4 and n5 while providing the advantage of a compact floor plan. Similarly, with respect to FIG. 1A, the macro 108 may be re-sized and re-shaped to recess a portion of macro 108 to provide a wider channel spacing for the set of nets n6. Macros may be re-sized, re-positioned, and/or re-shaped by re-sizing, re-positioning, and/or re-shaping the macros themselves and/or sub-macros within the macros.

Calculating of the channel width, re-sizing, re-shaping and and/or re-positioning of macros is controlled for die area optimization. For example, re-sizing, re-shaping and re-positioning of the macros is performed by taking into account the die size and pad/core limiting constraints, such that the re-sizing, re-shaping and re-positioning of the macros does not result in the area used by the macros exceeding a maximum size (such as the initialized die size). In some examples, the calculating, re-sizing, re-shaping and re-positioning is an automated and iterative process that is repeated numerous times to test various floor plans and arrive at a floor plan that achieves the most efficient use of the area of the die. For example, the floor plan may be modified with each iteration to determine whether the modification results in a more efficient use of the area of the die. The most efficient floor plan may be selected for further processing in the following step.

At action 510, power grid, pre-route, pre-buffering, custom buffering, and design rule checking steps are performed to optimize the design. In some examples, these steps are performed at least in part by a user. In some examples, one or more additional netlists may be loaded and the process is repeated at step 501 using the additional netlists to further re-size, re-shape and re-position macros. For example, a design change may modify a particular net of the netlist. The netlist may be modified to account for the change, and the process may return to step 501 to input the modified netlist and perform the corresponding macro and channel modifications.

At action 512, a place and route technique is performed to generate a layout from the design. The layout may be used to build the physical chip structure that corresponds to the layout.

Various embodiments may provide one or more advantages over conventional floor planning techniques. For instance, embodiments that provide non-uniform channel spacing allows for reducing the area of the SoC floor plan by more efficiently using the area of the channels. Additional methods may be performed for operating in the environment provided by the structures described herein. For example, methods performed include methods for communicating between macros and sub-macros across non-uniform channel spacings, such as by macros and sub-macros sending and receiving communication signals. Examples of macros, sub-macros, and channel spacings between the macros/sub-macros include the examples shown in FIGS. 1-4.

Communicating between macros and sub-macros includes transmitting signals unidirectionally and/or bidirectionally using analog and/or digital electrical signals that convey information. Transmitted information may include, for example, data, instructions, requests, and so forth. Communicating may include, for example, communicating a first signal from a first sub-macro of a first macro to a first sub-macro of a second macro, a second signal from a second sub-macro of the first macro to a second sub-macro of the second macro, and a third signal from a third sub-macro of the first macro to a third sub-macro of the second macro. In other examples, communication signals may be transmitted between any number of macros, which may include any number of sub-macros, across any number of channels having uniform and/or non-uniform channel spacings.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A semiconductor chip having multiple processing units, the semiconductor chip comprising:
   a first processing unit having a rectilinear shape, the first processing unit having on a side of the first processing unit a plurality of channel spacings;
   a first channel spacing of the plurality of channel spacings, the first channel spacing positioned in contact with the side of the first processing unit and a second processing unit;
   a second channel spacing of the plurality of channel spacings, the second channel spacing positioned in contact with the side of the first processing unit and the second processing unit,
      wherein a width of the second channel spacing is non-uniform with a width of the first channel spacing; and
   a third channel spacing of the plurality of channel spacings, the third channel spacing positioned in contact with the side of the first processing unit and the second processing unit,
      wherein a width of the third channel spacing is non-uniform with the width of the first channel spacing and with the width of the second channel spacing.

2. The semiconductor chip of claim 1, wherein the width of the first channel spacing extends from the side of the first processing unit to a side of the second processing unit,
   wherein the width of the second channel spacing extends from the side of the first processing unit to the side of the second processing unit,
   wherein the width of the third channel spacing extends from the side of the first processing unit to the side of the second processing unit.

3. The semiconductor chip of claim 2, wherein the side of the first processing unit is parallel to the side of the second processing unit.

4. The semiconductor chip of claim 2, wherein the width of the first channel spacing extends perpendicular to the side of the first processing unit and the side of the second processing unit.

5. The semiconductor chip of claim 2, wherein the side of the first processing unit includes a first plurality of facets,
   wherein the first plurality of facets extend in parallel to the side of the second processing unit.

6. The semiconductor chip of claim 5, wherein the side of the second processing unit includes a second plurality of facets, wherein the second plurality of facets extend in parallel to the first plurality of facets.

7. The semiconductor chip of claim 2, wherein the side of the first processing unit faces the side of the second processing unit.

8. The semiconductor chip of claim 1, further comprising:
a fourth channel spacing of the plurality of channel spacings, the fourth channel spacing positioned in contact with the side of the first processing unit and the second processing unit,
wherein a width of the fourth channel spacing is non-uniform with the width of the first channel spacing,
wherein the width of the fourth channel spacing is non-uniform with the width of the second channel spacing,
wherein a width of the fourth channel spacing is non-uniform with the width of the third channel spacing.

9. The semiconductor chip of claim 8, further comprising:
a fourth set of connections extending across the fourth channel spacing.

10. The semiconductor chip of claim 1, further comprising:
a first set of connections extending across the first channel spacing;
a second set of connections extending across the second channel spacing; and
a third set of connections extending across the third channel spacing.

11. A system comprising:
a computer processor built on a semi-conductor die, the computer processor having:
a first functional block having a plurality of communication connections between the first functional block and one or more other functional blocks,
wherein the first functional block is physically laid out on the semiconductor die as a rectilinear shape,
a second functional block of the one or more other functional blocks, wherein the second functional block is physically laid out on the semiconductor die; and
at least three non-uniform channel spacings between the first functional block and the second functional block.

12. The system of claim 11, wherein a first channel spacing of the at least three non-uniform channel spacings has a first width,
wherein a second channel spacing of the at least three non-uniform channel spacings has a second width,
wherein the first width is greater than the second width.

13. The system of claim 12, wherein at least two facets of the first functional block face the second functional block,
wherein a first facet of the at least two facets of the first functional block is in contact with the first channel spacing,
wherein a second facet of the at least two facets of the first functional block is in contact with the second channel spacing.

14. The system of claim 13, wherein the second facet of the at least two facets of the first functional block is included in a rectangular portion of the rectilinear shape,
wherein the rectangular portion extends from the rectilinear shape towards the second functional block.

15. The system of claim 13, wherein the first facet of the at least two facets of the first functional block is receded away from the second functional block.

16. The system of claim 11, wherein at least two facets of the second functional block face the first functional block.

17. An integrated circuit having multiple processing units, the integrated circuit comprising:
a first processing unit having a first rectilinear shape;
a second processing unit having a second rectilinear shape;
a plurality of non-uniform channel spacings between the first processing unit and the second processing unit;
a first facet of the first processing unit that is positioned in contact with at least one of the plurality of non-uniform channel spacings;
a second facet of the first processing unit that is positioned in contact with at least one of the plurality of non-uniform channel spacings; and
a third facet of the first processing unit that is positioned in contact with at least one of the plurality of non-uniform channel spacings.

18. The integrated circuit of claim 17, wherein the first facet of the first processing unit is separated from the second processing unit by a first width,
wherein the second facet of the first processing unit is separated from the second processing unit by a second width,
wherein the second width is greater than the first width,
wherein the third facet of the first processing unit is separated from the second processing unit by a third width, and
wherein the third width is greater than the second width.

19. The integrated circuit of claim 18, wherein the first width extends from a point of the first facet that is closest to the second processing unit to a point of the second processing unit that is closest to the first facet,
wherein the second width extends from a point of the second facet that is closest to the second processing unit to a point of the second processing unit that is closest to the second facet,
wherein the third width extends from a point of the third facet that is closest to the second processing unit to a point of the second processing unit that is closest to the third facet.

20. The integrated circuit of claim 18, further comprising:
a first facet of the second processing unit that faces the first processing unit,
wherein the first width extends between the first facet of the first processing unit and the first facet of the second processing unit;
wherein the second width extends between the second facet of the first processing unit and the first facet of the second processing unit.

21. The integrated circuit of claim 20, further comprising:
a second facet of the second processing unit that faces the first processing unit,
wherein the third width extends between the third facet of the first processing unit and the second facet of the second processing unit.

22. The integrated circuit of claim 17, further comprising:
a first set of connections extending between the first facet of the first processing unit and the second processing unit, wherein the first set of connections includes at least one portion that extends parallel to the first facet of the first processing unit;
a second set of connections extending between the second facet of the first processing unit and the second processing unit, wherein the second set of connections includes at least one portion that extends parallel to the second facet of the first processing unit; and a third set of connections extending between the third facet of the first processing unit and the second processing unit, wherein the third set of connections includes at least one portion that extends parallel to the third facet of the first processing unit.

23. The integrated circuit of claim 22, wherein the first set of connections, the second set of connections and the third set of connections extend across the plurality of non-uniform channel spacings.

24. The integrated circuit of claim 17, wherein all of the plurality of non-uniform channel spacings have widths that extend in a perpendicular direction from the first facet, the second facet, and the third facet to the second processing unit.

25. The integrated circuit of claim 17, wherein the first facet of the first processing unit extends parallel to the second facet of the first processing unit, and wherein the second facet of the processing unit extends parallel to the third facet of the first processing unit.

26. The integrated circuit of claim 17, wherein the first facet of the first processing unit faces at least one facet of the second processing unit, wherein the second facet of the first processing unit faces at least one facet of the second processing unit, and wherein the third facet of the first processing unit faces at least one facet of the second processing unit.

\* \* \* \* \*